(12) United States Patent
Hasuike et al.

(10) Patent No.: US 10,528,192 B2
(45) Date of Patent: *Jan. 7, 2020

(54) PROJECTION DISPLAY UNIT

(71) Applicant: SONY CORPORATION, Tokyo (JP)

(72) Inventors: Takaki Hasuike, Kanagawa (JP);
Hajime Ishihara, Ibaraki (JP);
Masaharu Sakata, Kanagawa (JP);
Yasutaka Saito, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,590

(22) Filed: Apr. 17, 2019

(65) Prior Publication Data
US 2019/0243512 A1    Aug. 8, 2019

Related U.S. Application Data

(63) Continuation of application No. 15/512,168, filed as application No. PCT/JP2015/074412 on Aug. 28, 2015, now Pat. No. 10,303,306.

(30) Foreign Application Priority Data
Oct. 3, 2014    (JP) ................................. 2014-204637

(51) Int. Cl.
*G06F 3/042*   (2006.01)
*G03B 21/00*   (2006.01)
*G03B 21/14*   (2006.01)
*H04N 5/74*    (2006.01)
*G03B 21/20*   (2006.01)

(52) U.S. Cl.
CPC ........... *G06F 3/0425* (2013.01); *G03B 21/00* (2013.01); *G03B 21/14* (2013.01); *G03B 21/145* (2013.01); *G03B 21/2013* (2013.01); *G03B 21/2053* (2013.01); *G03B 21/2073* (2013.01); *H04N 5/74* (2013.01)

(58) Field of Classification Search
CPC .... G06F 3/0425; H04N 5/74; G03B 21/2013; G03B 21/2073; G03B 21/2053; G03B 21/00; G03B 21/145; G03B 21/14
See application file for complete search history.

(56) References Cited

U.S. PATENT DOCUMENTS 9,465,484 B1    10/2016   Kamarshi et al.
2009/0027571 A1  1/2009   Amano
2015/0089453 A1  3/2015   Dal Mutto et al.

*Primary Examiner* — Muhammad N Edun
(74) *Attorney, Agent, or Firm* — Chip Law Group

(57) ABSTRACT

A projection display unit (1) includes a body (10) and an invisible light application unit (30). The body (10) includes a projection optical system and a detection optical system. The projection optical system projects an image onto a projection surface (110). The detection optical system acquires an imaging signal based on invisible light. The invisible light application unit (30) applies the invisible light along a surface in vicinity of the projection surface while being placed on a surface that is an extension of the projection surface. The body (10) is movable with respect to an output opening (31) of the invisible light application unit, and a position of the body is adjustable with respect to the projection surface.

20 Claims, 14 Drawing Sheets

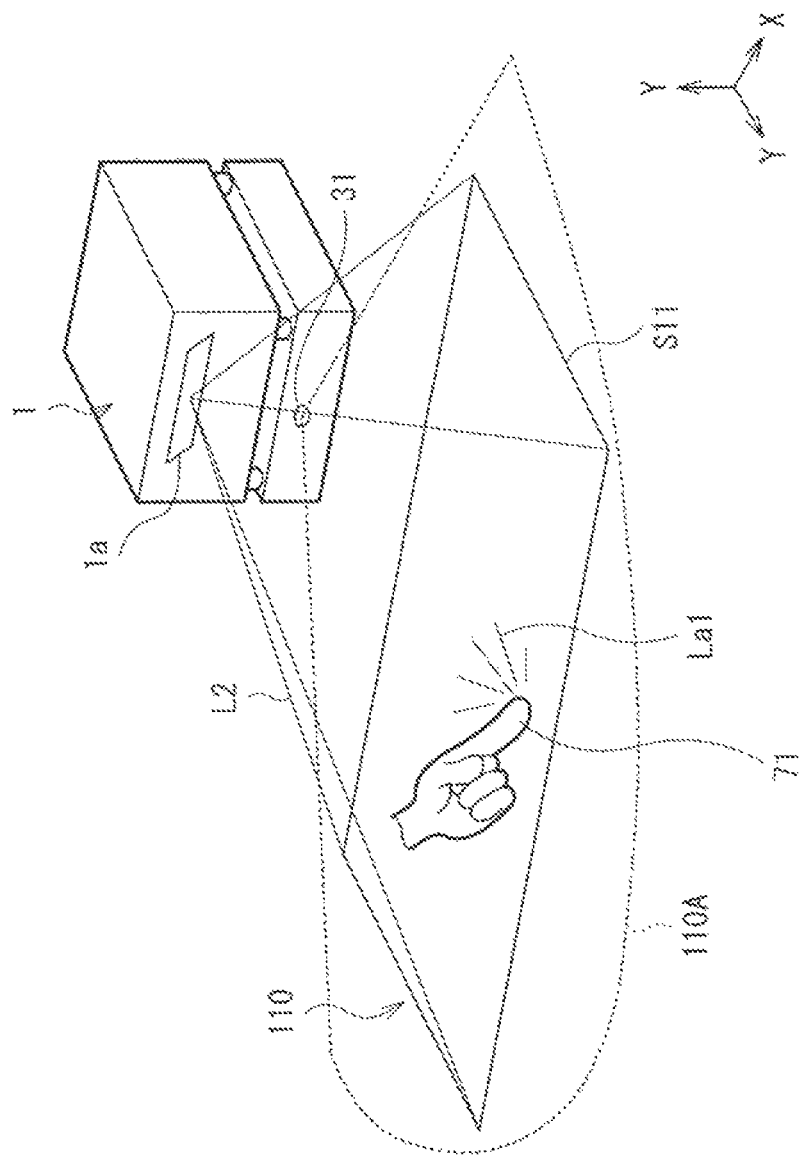

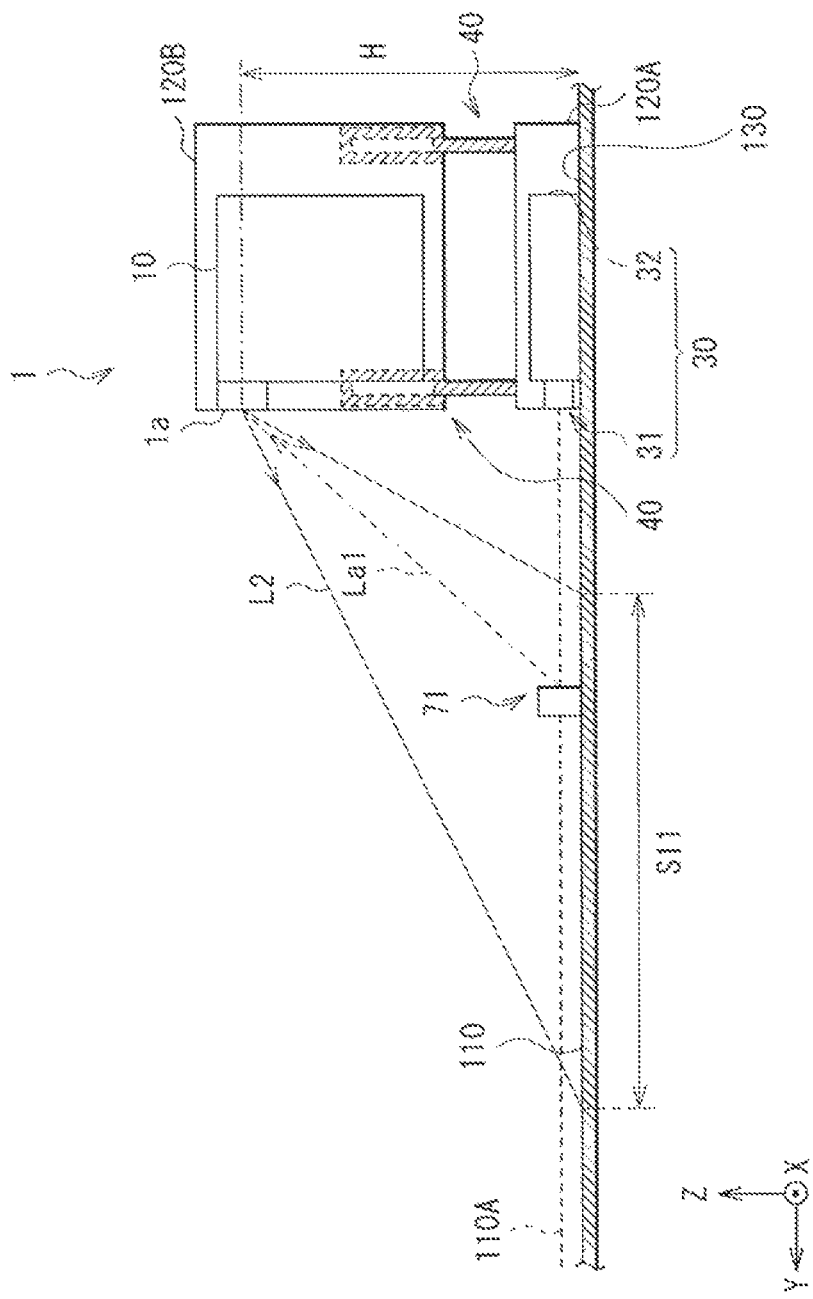
[FIG. 2]

[FIG. 3]
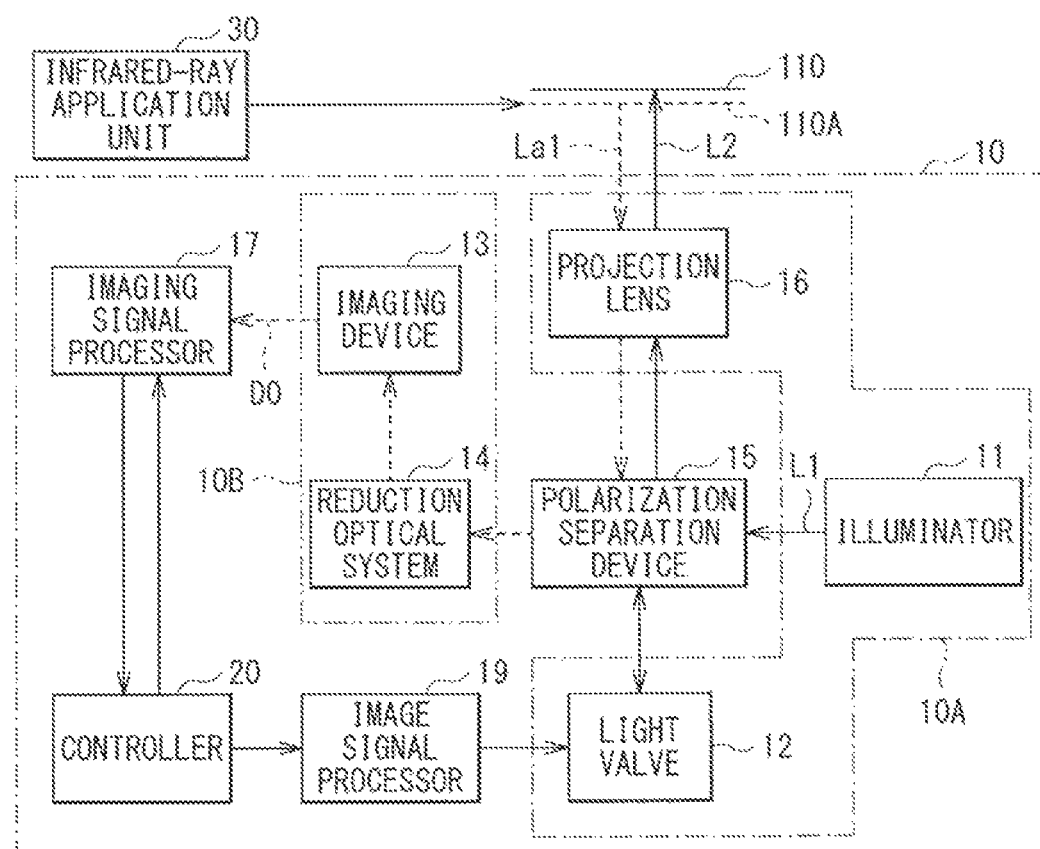

[FIG. 4]
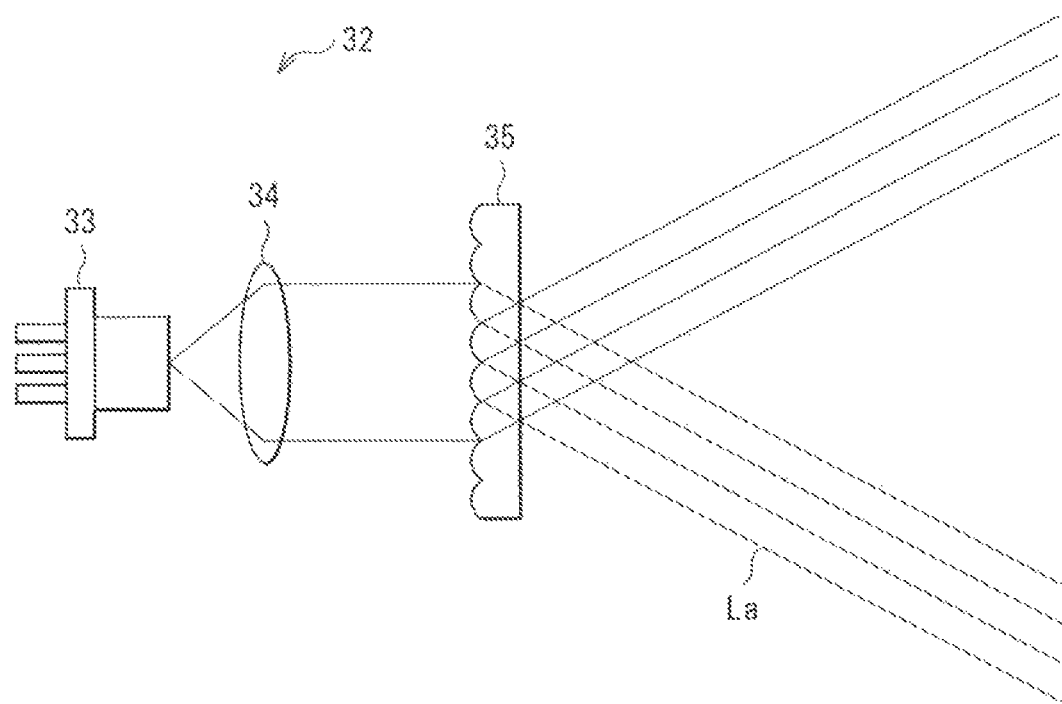
[FIG. 5A]
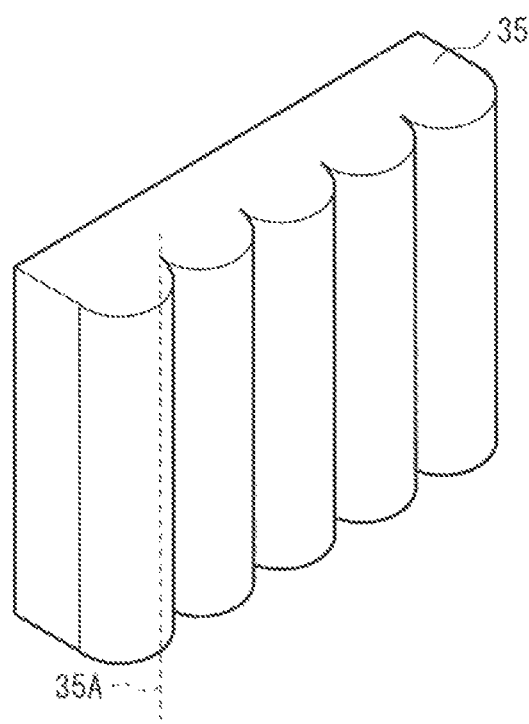

[FIG. 5B]
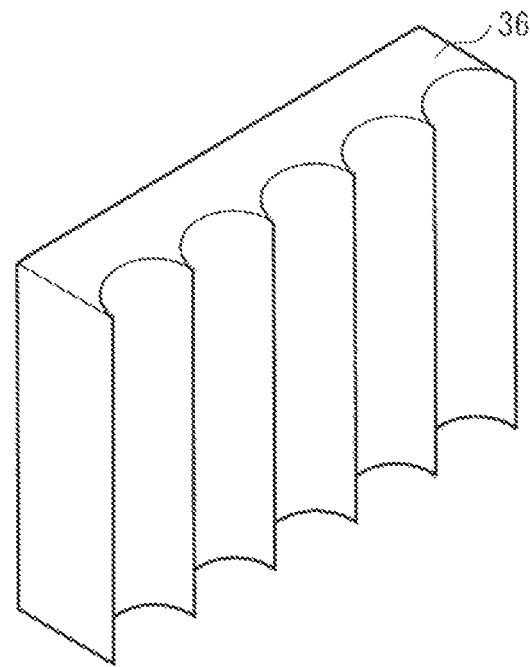
[FIG. 6]
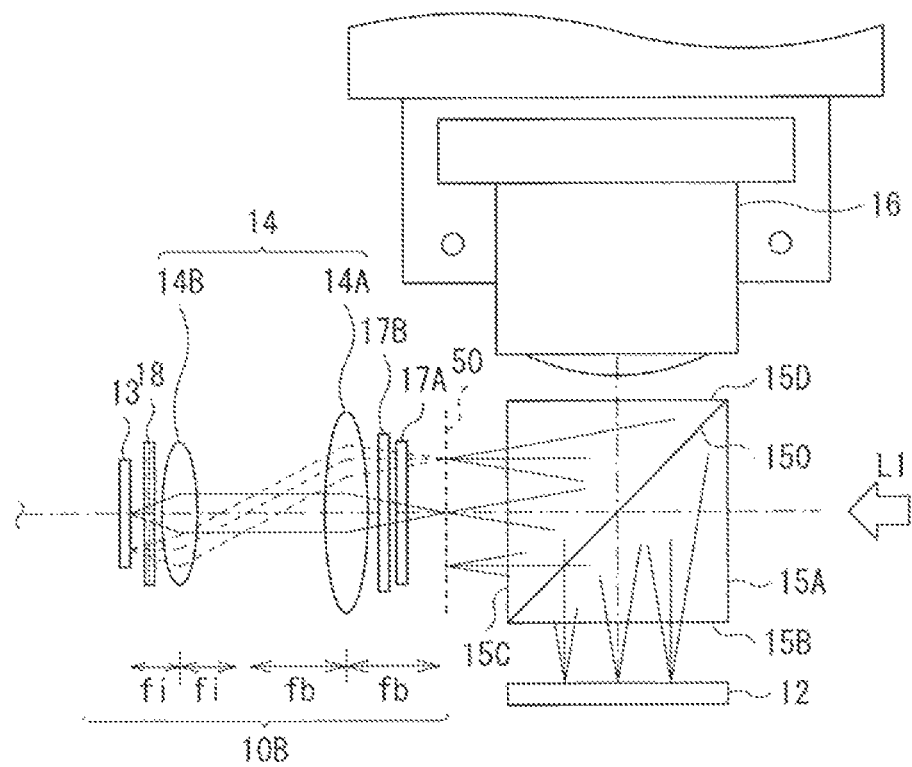

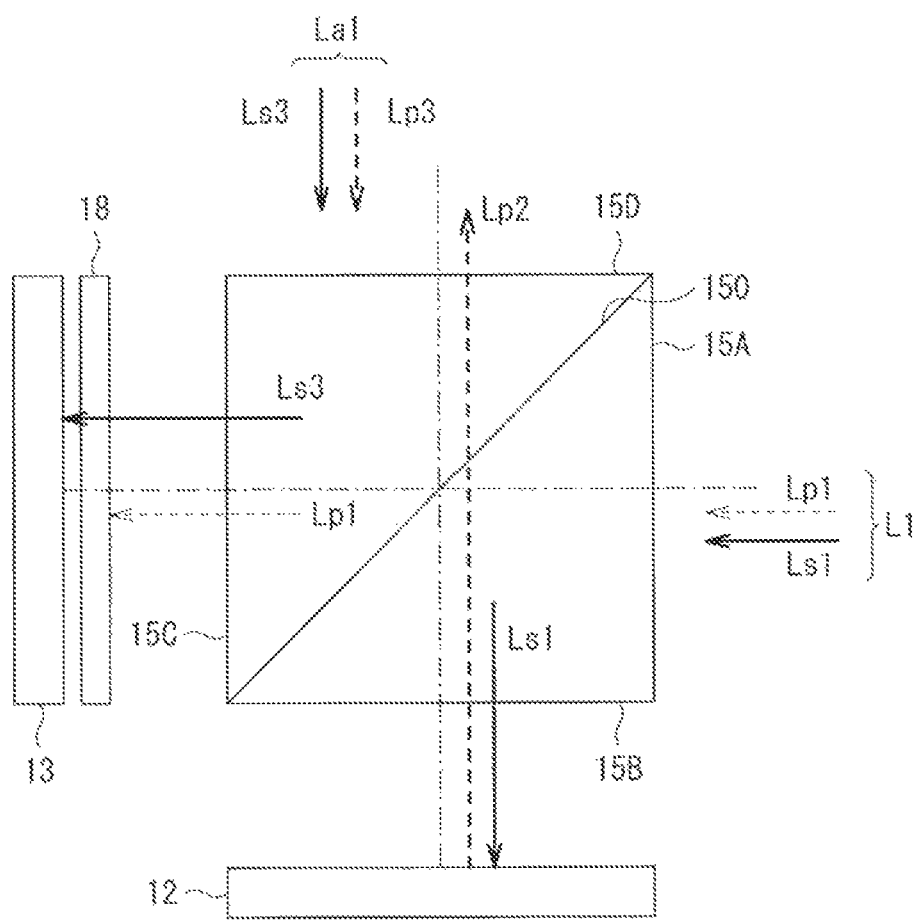
[FIG. 7]

[FIG. 8]
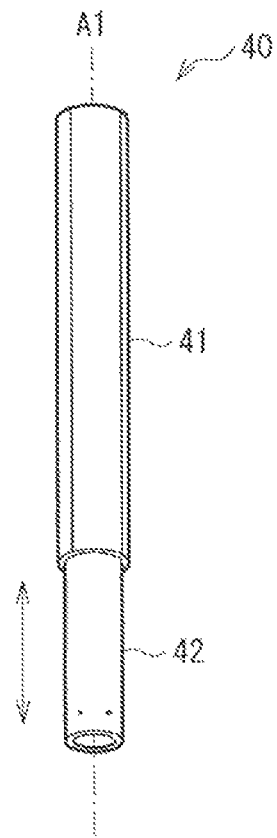
[FIG. 9A]
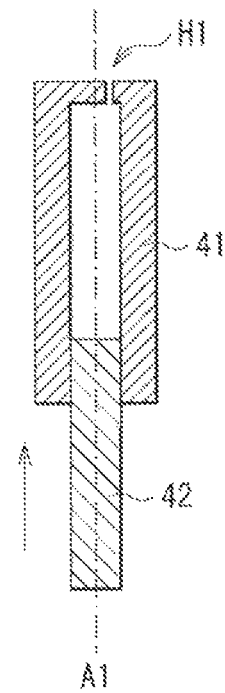

[ FIG. 9B ]
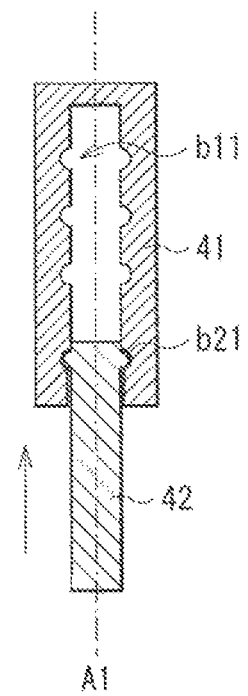
[ FIG. 9C ]
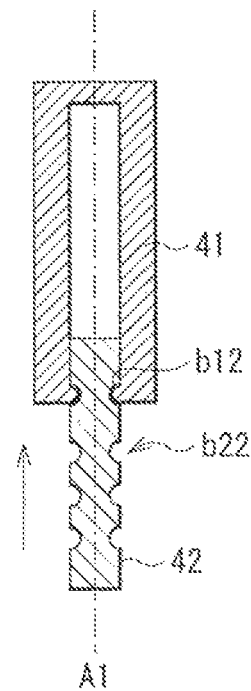

[FIG. 10]
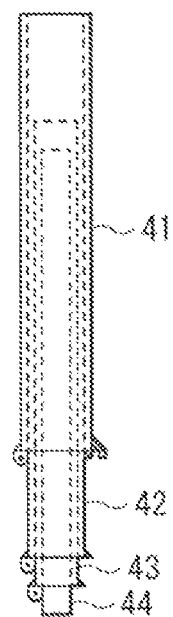

[FIG. 12A]
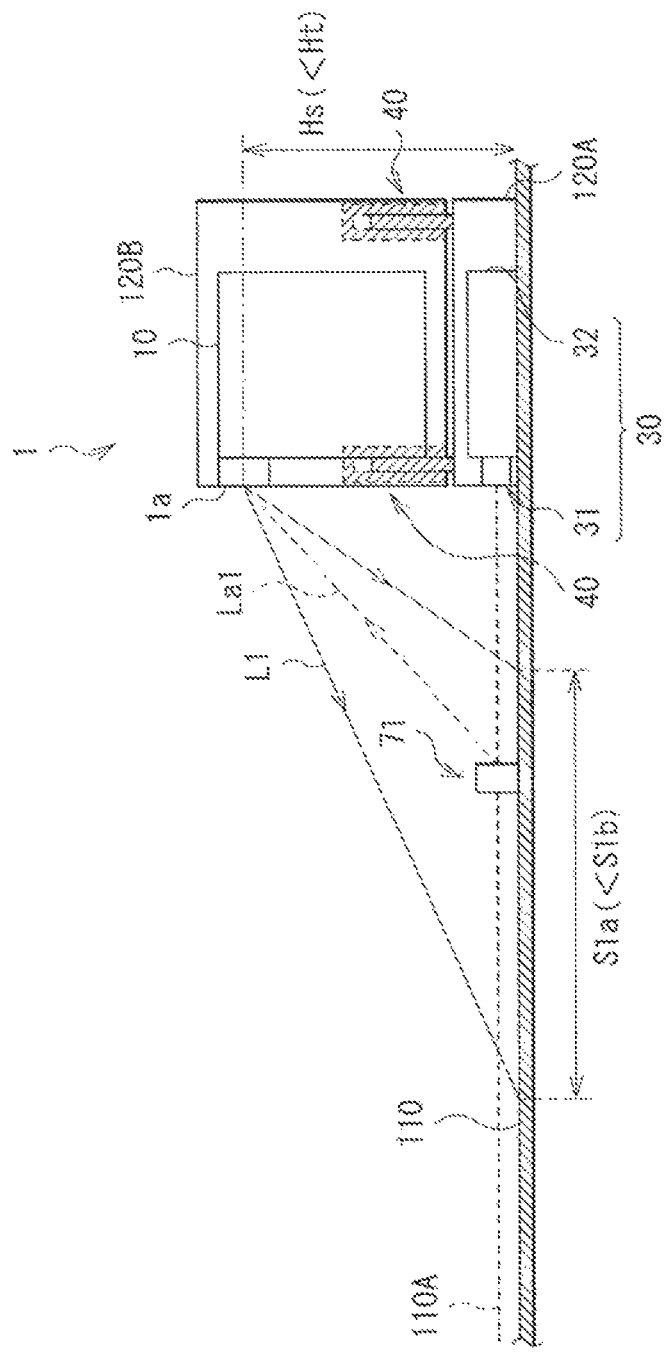

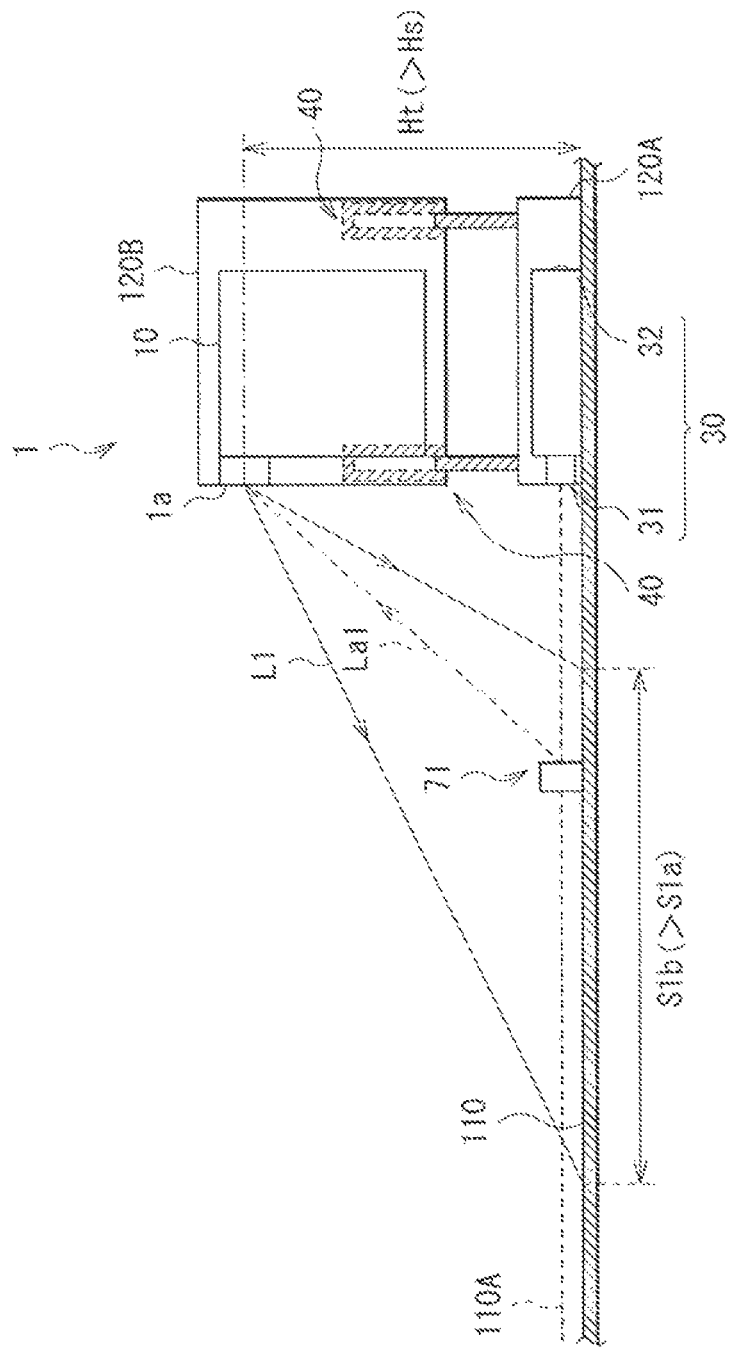
[FIG. 12B]

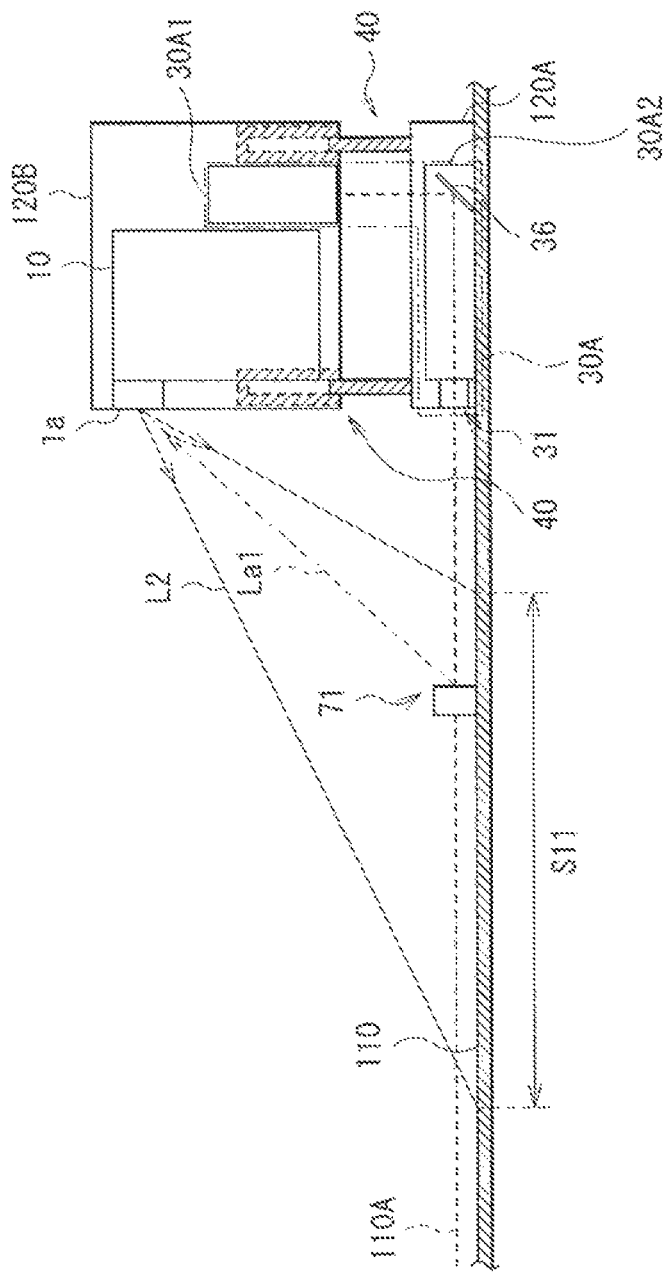
[FIG. 13]

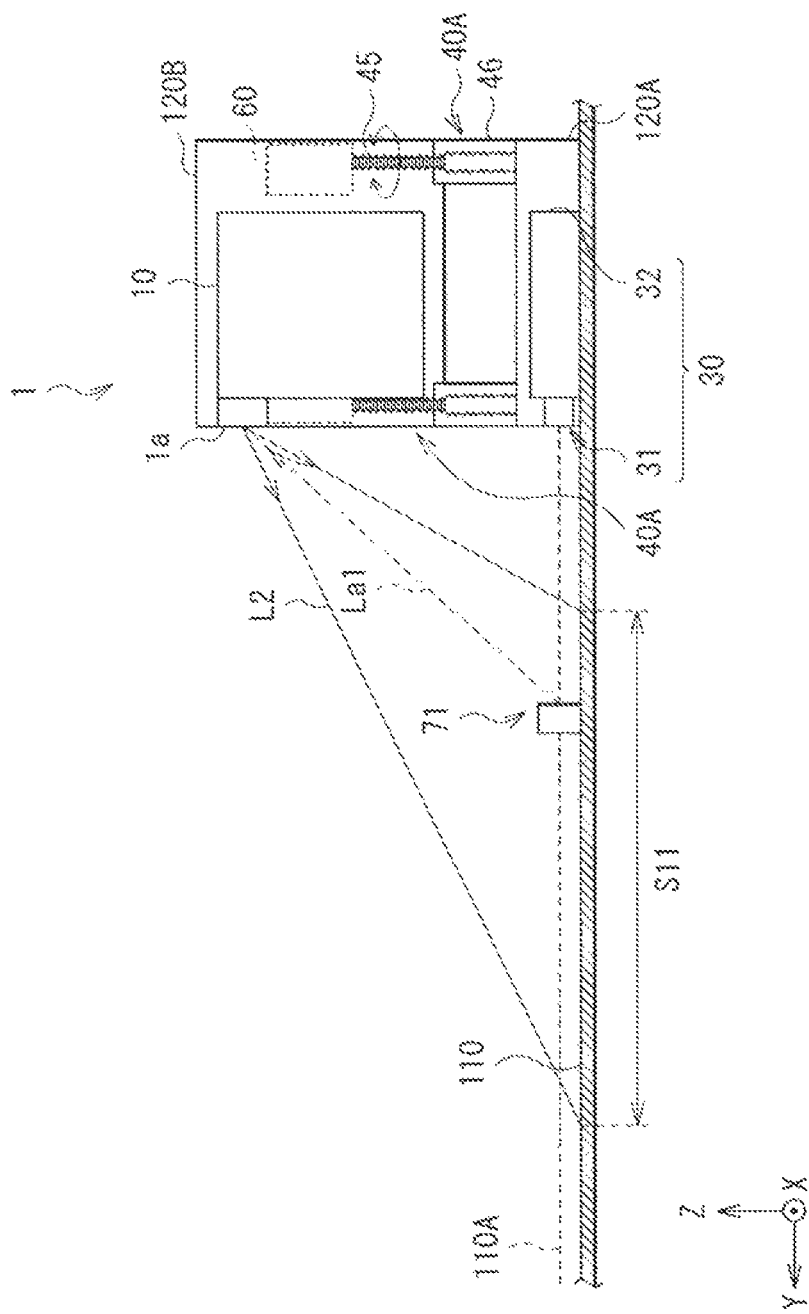
[FIG. 14]

PROJECTION DISPLAY UNIT

CROSS REFERENCE TO RELATED APPLICATIONS

This present application is a continuation application of U.S. patent application Ser. No. 15/512,168, filed Mar. 17, 2017, which is a National Stage Entry of Patent Application No. PCT/JP2015/074412, filed Aug. 28, 2015, which claims priority from prior Japanese Patent Application JP 2014-204637, filed in the Japan Patent Office on Oct. 3, 2014, the entire contents of which are incorporated herein by reference.

TECHNICAL FIELD

The disclosure relates to a projection display unit having a detection function.

BACKGROUND ART

In recent years, for example, a smartphone or a tablet terminal may include a touch panel, thereby allowing, for example, page-turning, zooming-in, or zooming-out of an image displayed on a screen to be performed by an intuitive pointing operation. On the other hand, as a display unit that performs display by projecting an image onto a screen, a projector (a projection display unit) has been long known. There is proposed a technology to add a detection function such as that of a touch panel to the projector, for example, as disclosed in PTLs 1 and 2.

CITATION LIST

Patent Literature

PTL 1: Japanese Unexamined Patent Application Publication No. 2007-52218
PTL 2: Japanese Unexamined Patent Application Publication No. 2003-44839

SUMMARY OF INVENTION

The foregoing projector allows for performing of an input operation (a touch input operation) by directly touching an image projected onto a projection surface, for example, with a finger.

It is to be noted that a size of a screen (a projected screen) to be projected onto (displayed on) the projection surface generally varies in accordance with a projection distance. It is desired to achieve a unit that allows the foregoing touch input operation to be performed even when the size of the projected screen is increased or decreased by varying the projection distance.

Accordingly, it is desirable to provide a projection display unit that achieves both an object detection function and a function of varying the size of the projected screen.

A projection display unit according to one embodiment of the disclosure includes a body and an invisible light application unit. The body includes a projection optical system and a detection optical system. The projection optical system projects an image onto a projection surface. The detection optical system acquires an imaging signal based on invisible light. The invisible light application unit applies the invisible light along a surface in the vicinity of the projection surface while being placed on a surface that is an extension of the projection surface. The body is movable with respect to an output opening of the invisible light application unit, and a position of the body is adjustable with respect to the projection surface.

The projection display unit according to the embodiment of the disclosure has a configuration in which the body is movable with respect to the invisible light application unit that applies the invisible light along the surface in the vicinity of the projection surface, and the position of the body is adjustable. Accordingly, for example, it is possible to adjust the projection distance by varying the position (a height) of the body without varying the position (a height) of the output opening for the invisible light with respect to the projection surface. In other words, it is possible to apply the invisible light for object detection along the surface in the vicinity of the projection surface while increasing or decreasing the size of the projected screen by adjusting the projection distance.

According to the projection display unit of the embodiment of the disclosure, the body including the projection optical system and the detection optical system is movable with respect to the invisible light application unit that applies the invisible light along the surface in the vicinity of the projection surface while being placed on the surface that is the extension of the projection surface. Further, the position of the body with respect to the projection surface is adjustable. This makes it possible to perform the object detection in the vicinity of the projection surface even when the size of the projected screen is increased or decreased by varying the projection distance. Accordingly, it is possible to achieve both the object detection function and the function of varying the size of the projected screen.

It is to be noted that the above-described content is a mere example of the disclosure. Effects of the disclosure are not limited to the effects described above, and may be different from the effects described above, or may further include any other effect.

BRIEF DESCRIPTION OF DRAWINGS

FIG. 1 schematically illustrates an appearance and a usage state of a projection display unit according to one embodiment of the disclosure.

FIG. 2 schematically illustrates an outline configuration of the projection display unit illustrated in FIG. 1.

FIG. 3 is a functional block diagram of the projection display unit illustrated in FIG. 1.

FIG. 4 illustrates a configuration example of an infrared-ray application unit.

FIG. 5A is a perspective view of a first configuration example of a cylinder array lens.

FIG. 5B is a perspective view of a second configuration example of the cylinder array lens.

FIG. 6 illustrates a configuration of a key part of a body illustrated in FIG. 2.

FIG. 7 schematically illustrates a configuration example of a polarization separation device together with states of entering light and output light.

FIG. 8 illustrates a configuration example of an adjusting member illustrated in FIG. 2.

FIG. 9A schematically illustrates an example of a cross-sectional configuration of the adjusting member illustrated in FIG. 8.

FIG. 9B schematically illustrates another example of the cross-sectional configuration of the adjusting member illustrated in FIG. 8.

FIG. 9C schematically illustrates still another example of the cross-sectional configuration of the adjusting member illustrated in FIG. 8.

FIG. 10 illustrates another configuration example of the adjusting member illustrated in FIG. 2.

FIG. 12A is a schematic diagram for describing a configuration in a case where a size of a projected screen is small.

FIG. 12B is a schematic diagram for describing a configuration in a case where the size of the projected screen is large.

FIG. 13 schematically illustrates an outline configuration of a projection display unit according to Modification 1.

FIG. 14 schematically illustrates an outline configuration of a projection display unit according to Modification 2.

MODES FOR CARRYING OUT THE INVENTION

Figure 11:
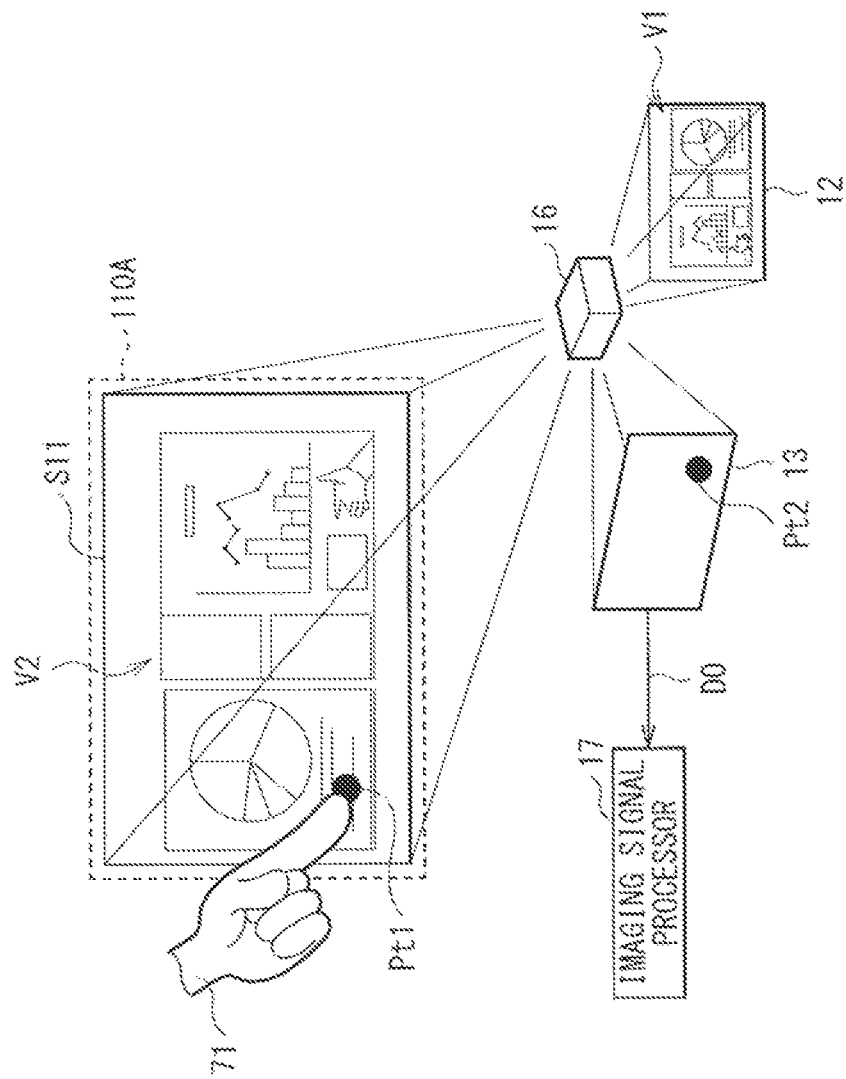
FIG. 11 schematically illustrates a concept of image display and object detection of the projection display unit illustrated in FIG. 1.

Some embodiments of the disclosure are described in detail below referring to the accompanying drawings. It is to be noted that the description is given in the following order.
1. Embodiment (An example in which a body and an infrared-ray application unit are provided separately from each other and an adjusting member is provided between the body and the infrared-ray application unit)
2. Modification 1 (An example in a case where the infrared ray is applied to a surface in the vicinity of a projection surface with a reflective mirror)
3. Modification 2 (An example in a case where a height of the adjusting member is automatically adjusted)
4. Application Example (An example of an application function in accordance with a variation in size of a projected screen)

<Embodiment>
[Configuration]

FIG. 1 illustrates an appearance and a usage state of a projection display unit (a projection display unit 1) according to one embodiment of the disclosure. FIG. 2 illustrates an outline configuration of the projection display unit 1. FIG. 3 illustrates a functional configuration of the projection display unit 1.

The projection display unit 1 may be, for example, a projector of a type (a so-called ultra-short throw type) that is used on a table such as a table, a desk, and a stand and projects an image onto the vicinity of the projection display unit while being placed on the table. In other words, a projection surface (a surface onto which the image is projected and displayed) 110 and an installation surface (a surface on which the projection display unit 1 is placed) 130 of the projection display unit 1 are extensions of each other (FIG. 2). It is to be noted that a case where the projection surface 110 and the installation surface 130 are continuously provided to form a flat surface as a usage example of the projection display unit 1. However, the installation surface 130 may be allowed to be inclined with respect to the projection surface 110, for example, by mounting a predetermined inclination correction mechanism. Further, the projection display unit 1 is not limitedly used on the table, and may be used while being attached to a vertical surface such as a wall (a surface of the wall may serve as the projection surface 110 and the installation surface 130).

The projection display unit 1 may also have a function of actively performing object detection in addition to the image display function. As illustrated in FIG. 1, a user may be allowed to perform a predetermined input operation by performing an operation in a way such as touching a displayed image with a finger (an indicator 71) on a screen (a projected screen S11) which an image is projected onto (displayed on), as will be described in detail later.

Referring to FIG. 2, the projection display unit 1 may include a body 10 and an infrared-ray application unit 30. The body 10 includes a projection optical system 10A and a detection optical system 10B. In detail, referring to FIG. 3, the body 10 may include an illuminator 11, a light valve 12, an imaging device 13, a reduction optical system 14, a polarization separation device 15, a projection lens 16, an imaging signal processor 17, an image signal processor 19, and a controller 20. Out of the foregoing members, for example, the illuminator 11, the light valve 12, and the projection lens 16 may configure the projection optical system 10A. Further, for example, the imaging device 13 and the reduction optical system 14 may configure the detection optical system 10B. It is to be noted that, for example, the illuminator 11, the light valve 12, and the imaging device 13 may each be driven by an unillustrated drive unit at a predetermined timing on the basis of a control performed by the controller 20. Specific configurations of the respective members are described below.

The infrared-ray application unit 30 may be a light source unit that applies an infrared ray (infrared light) such as a near-infrared (NIR) ray as invisible light for detection along a surface in the vicinity of the projection surface 110. In other words, the infrared-ray application unit 30 may provide, in the vicinity of the projection surface 110, a barrier (a detection light plane 110A) of the infrared ray so as to cover the projected screen S11. The detection light plane 110A may be provided on a surface at a predetermined height in the vicinity of the projection surface 110 that is different from a height of an optical axis passing through the projection lens 16 (FIG. 2). Therefore, the infrared-ray application unit 30 may be provided below the body 10, and may be provided adjacent to or in proximity to the installation surface 130 when the projection display unit 1 is placed on the installation surface 130.

To give an example, the detection light plane 110A may be provided, for example, with a thickness (a width in a height direction) from 2 mm to 3 mm at a position at the height of about several millimeters to about several tens of millimeters from the projection surface 110. Further, the detection light plane 110A may cover the projected screen S11 in an in-plane direction. In general, the projection surface 110 is flat. Therefore, in the absence of any blocking object or the indicator 71 such as a finger and a pointer, the detection light plane 110A is not blocked. In other words, the imaging device 13 monitoring the projection surface 110 may not capture the indicator 71. In this state, when, for example, a finger is brought in proximity to the projection surface 110, or performs an operation such as touching the projection surface 110, the infrared ray of the detection light plane 110A may be blocked by the finger, and be thereby reflected and diffused. The light reflected by the finger may travel in various directions. However, part (an infrared ray La1) of the reflected light may be taken in by an aperture of the projection lens 16. The infrared ray La1 may arrive at the imaging device 13 via the projection lens 16 and the polarization separation device 15. At this time, bright spot diffusion points each occurring in a dot shape on the projection surface 110 may be imaged at a position, on the imaging device 13, corresponding to a position in the projection surface 110, since the imaging device 13 is disposed at a position that is optically conjugate with a position of the light valve 12 that forms an image. This allows for detection of a position of an object. Moreover, the ultra-short throw type may be advantageous in visibility of a screen upon performing of an operation. One reason for this is that projection light of the ultra-short throw type travels the vicinity of the projection surface 110, and is therefore more difficult to be blocked by part of a body of a person who performs an operation.

Owing to this detection light plane 110A, when the object (the indicator 71) is brought into contact with or in proximity to the projection surface 110, the infrared ray may be reflected (reflected and diffused) by the indicator 71. Part (the infrared ray La1) of the reflected light may be taken in by the projection display unit 1 as detection light.

The infrared-ray application unit 30 may have an infrared-ray application optical system 32 and an output opening 31. The infrared-ray application unit 30 may have a configuration in which the infrared ray generated in the infrared-ray application optical system 32 is outputted from the output opening 31 provided in a housing 120B which will be described later. Referring to FIG. 4, the infrared-ray application optical system 32 may include a near-infrared laser 33, a collimator lens 34, and a cylinder array lens 35, for example. Infrared ray (near-infrared ray) La outputted from the cylinder array lens 35 may provide the detection light plane 110A. Referring to FIG. 5A, the cylinder array lens 35 may include an array of a plurality of convex cylinder lenses. The cylinder array lens 35 may be so disposed that a generatrix 35A of each of the cylinder lenses faces a plane perpendicular to the projection surface 110. It is to be noted that, instead of the convex cylinder array lens 35, a cylinder array lens 35 including an array of a plurality of concave cylinder lenses as illustrated in FIG. 5B may be used.

(Projection Optical System 10A)

FIG. 6 illustrates an example of a configuration of a key part of the body 10. The illuminator 11 may output illumination light L1 toward the light valve 12 via the polarization separation device 15. The illuminator 11 is not specifically limited as long as the illuminator 11 outputs visible light as the illumination light L1. For example, the illuminator 11 may include an unillustrated blue laser, an unillustrated green laser, and an unillustrated red laser.

The light valve 12 may be a reflective liquid crystal device such as liquid crystal on silicon (LCOS), for example. The light valve 12 may modulate a first polarized component (for example, an s-polarized component Ls1 described later) included in the illumination light L1, on the basis of an image signal supplied from the image signal processor 19. A polarization state of the light modulated by the light valve 12 may be rotated to be converted into a second polarized component (for example, a p-polarized component Lp1 described later). This modulated light may be outputted toward the projection lens 16 via the polarization separation device 15. It is to be noted that the light valve 12 may allow for black display by returning entering light (the s-polarized component Ls1) to the polarization separation device 15 without changing the polarization state thereof. A planar shape of an effective region of the light valve 12 may be rectangular, for example.

The projection lens 16 may project, onto the projection surface 110, light (image light L2) having entered from the light valve 12 via the polarization separation device 15. The projection lens 16 may be an ultra-short throw lens with a throw ratio of 0.38 or smaller, for example. It is to be noted that the throw ratio is expressed by L/H, where L is a distance from the projection lens 16 to the projection surface 110, and H is a width of the projected screen S11. Referring to FIGS. 3 and 6, the projection lens 16 may receive the detection light (the infrared ray La1) from a direction opposite to a traveling direction of the modulated light. In the present embodiment, the detection light may be taken in via the projection lens 16 of the projection optical system 10A to be guided to the detection optical system 10B as described above.

(Polarization Separation Device 15)

The polarization separation device 15 may separate entering light into the first polarized component (for example, the s-polarized component) and the second polarized component (for example, the p-polarized component), and output the first polarized component and the second polarized component in respective directions that are different from each other. The polarization separation device 15 may include a polarizing beam splitter (PBS), for example. The polarization separation device 15 may selectively reflect the first polarized component (reflect the first polarized component by a polarization separation surface 150) and allow the second polarized component to selectively pass therethrough (pass through the polarization separation surface 150). The present embodiment is described referring to an example case in which the polarizing beam splitter is used as the polarization separation device 15. However, the polarization separation device 15 is not limited to the polarizing beam splitter, and may include a wire grid. In this case, the wire grid has different characteristics from those of the polarizing beam splitter, therefore selectively reflecting the p-polarized component as the first polarized component of entering light and allowing the s-polarized component as the second polarized component to selectively pass therethrough.

The polarization separation device 15 may have four optical surfaces (a first surface 15A, a second surface 15B, a third surface 15C, and a fourth surface 15D) and the polarization separation surface 150, for example. The first surface 15A and the third surface 15C may face each other in a uniaxial direction (a right-left direction in the diagram), and the second surface 15B and the fourth surface 15D may face each other in a uniaxial direction (a top-bottom direction in the diagram). In such a configuration, the first surface 15A may receive the illumination light L1, and the second surface 15B may face the light valve 12. The third surface 15C may face the detection optical system 10B. The fourth surface 15D may face the projection lens 16.

FIG. 7 illustrates a configuration example of the polarization separation device 15. As illustrated, the polarization separation device 15 may reflect the first polarized component (the s-polarized component Ls1) out of the illumination light L1 having entered the polarization separation device 15 from the first surface 15A to output the reflected light from the second surface 15B. Meanwhile, the polarization separation device 15 may output, from the third surface 15C, the second polarized component (the p-polarized component Lp1) out of the illumination light L1. Further, the polarization separation device 15 may output, from the fourth surface 15D, the second polarized component (a p-polarized component Lp2) out of light having entered the polarization separation device 15 from the second surface 15B (the light modulated by the light valve 12). This may allow for image projection by the projection optical system 10A. Meanwhile, the polarization separation device 15 may reflect the first polarized component (an s-polarized component Ls3) out of light (the infrared ray La1) having entered the polarization separation device 15 from the fourth surface 15D to output the reflected light from the third surface 15C. Light based on the foregoing s-polarized component Ls3 may be received by the imaging device 13. Thus, an imaging signal DO may be obtained from the imaging device 13.

(Detection Optical System 10B)

The imaging device 13 may be disposed at a position that is optically conjugate with a position of the light valve 12. More specifically, when the light valve 12 is a reflective liquid crystal device, the imaging device 13 may be so disposed that a display surface (a liquid crystal surface) where an image is produced and an imaging surface of the imaging device 13 are in a relationship optically conjugate with each other. The imaging device 13 may include a solid-state imaging device such as a complementary metal-oxide semiconductor (CMOS) and a charge coupled device (CCD), for example.

Referring to FIG. 6, an example of the detection optical system 10B including the foregoing imaging device 13 may include a visible light cut filter 17A, a bandpass filter 17B, the reduction optical system 14 (relay lens groups 14A and 14B), a polarizer 18, and the imaging device 13 that are disposed in order from a conjugate plane 50 side, for example.

The visible light cut filter 17A may reduce a visible light component of entering light. Provision of the visible light cut filter 17A makes it possible to cut a large quantity of the illumination light L1 that is to enter the imaging device 13 without turning off a light source of the illuminator 11, even when the polarizing beam splitter is used as the polarization separation device 15. This allows nearly only the detection light to enter the imaging device 13, increasing an S/N ratio to improve detection accuracy. It is to be noted that one visible light cut filter 17A may be provided in this example; however, the number of the visible light cut filter is not limited to one, and may be two or more. Moreover, the visible light cut filter 17A may be disposed at a position between the conjugate plane 50 and the reduction optical system 14; however, the visible light cut filter 17A may be disposed at another position, for example, at a position between the reduction optical system 14 and the imaging device 13.

The bandpass filter 17B may allow a specific wavelength (near-infrared ray) to selectively pass therethrough and reduce other wavelengths.

The polarizer 18 may be an optical member that reduces the second polarized component included in the illumination light L1. In this example, the polarization separation device 15 as described above may allow the second polarized component (for example, the p-polarized component) out of the illumination light L1 to pass therethrough, allowing the p-polarized component to enter the detection optical system 10B. This may influence an S/N ratio of the imaging signal obtained in the imaging device 13. Provision of the polarizer 18 as in the present embodiment may cut the second polarized component (for example, the p-polarized component) included in the illumination light L1, thereby increasing the S/N ratio. It is to be noted that the position of the polarizer 18 is not limited to the illustrated position between the reduction optical system 14 and the imaging device 13. The polarizer 18 may be disposed at another position, for example, at a position between the conjugate plane 50 and the reduction optical system 14.

The reduction optical system 14 may include one or a plurality of relay lens groups (two relay lens groups 14A and 14B, in this example). Each of the relay lens groups 14A and 14B may have positive power, and include at least one lens. A focal length fi of the relay lens group 14B may be so set as to be smaller than a focal length fb of the relay lens group 14A. For example, on condition that 2fi is equal to fb (2fi=fb), the relay lens group 14A may be disposed at a position away from the conjugate plane 50 of the light valve 12 by the focal length fb, the relay lens group 14B may be disposed at a position away from the foregoing position of the relay lens group 14A by (fb+fi), and the imaging device 13 may be disposed at a position away from the relay lens group 14B by the focal length fi. Such an arrangement of the relay lens groups 14A and 14B may be equivalent to a case where the imaging device 13 is disposed on the conjugate plane 50 while achieving a reduction optical system. In other words, it is possible to further reduce the size of the imaging device 13 while maintaining a positional relationship conjugate with the light valve 12. It is to be noted that the present embodiment is described referring to an example case in which the detection optical system 10B includes the reduction optical system 14. However, the reduction optical system 14 may not be provided. In other words, the detection optical system 10B may include an enlargement optical system or a non-magnification optical system.

Object detection by means of the foregoing reduction optical system 14 may be advantageous in cost reduction. The cost of the imaging device 13 may be greatly influenced by the size of the imaging device 13. Cost of configuring the projector is weighted heavily toward the light valve 12 and the imaging device 13 as semiconductor components. Therefore, a size reduction in such components may be advantageous in terms of cost. Moreover, object detection by means of the foregoing reduction optical system 14 may be advantageous in increased flexibility of arrangement attributed to extension of a conjugate point by a relay optical system. For example, spacing between components may be provided, allowing for a bending optical system by providing a reflective mirror in the spacing.

The image signal processor 17 may perform an arithmetic process on the basis of the imaging signal DO supplied from the imaging device 13. The image signal processor 17 may thereby detect a position of a characteristic point of the indicator (the object) 71 such as a human finger or a pointer in correspondence with the coordinate on the projected screen S11 on the projection surface 110, for example. Examples of the characteristic point to be used may include a shape of a tip of the human finger, the center of gravity of the finger, and the center of gravity of a hand.

The image signal processor 19 may generate an image signal for the light valve 12 on the basis of an image signal supplied from outside, for example. The generated image signal may be supplied, as an image voltage, to each pixel of the light valve 12 via, for example, an unillustrated timing controller or an unillustrated drive unit (a driver circuit).

In the projection display unit 1, the foregoing body 10 (the projection optical system 10A and the detection optical system 10B) and the infrared-ray application unit 30 may be provided separately from each other. Specifically, referring to FIG. 2, a housing 120A (a first housing) and the housing 120B (a second housing) may be provided separately from each other and disposed in order from the installation surface 130 side. The housing 120A may contain the infrared-ray application unit 30 (the infrared-ray application optical system 32), and have the output opening 31 for the infrared ray. The housing 120B may contain the body 10 (the projection optical system 10A and the detection optical system 10B), and have a projection opening 1a. The projection opening 1a may serve both as an output opening for the image light L2 and a take-in opening for the infrared ray La1 for detection.

In the present embodiment, the body 10 may be movable with respect to the infrared-ray application unit 30 (in detail, the output opening 31), and the position of the body 10 with respect to the projection surface 110 (the installation surface 130) may be adjustable. Specifically, an adjusting member 40 may be provided that performs adjustment of the position of the body 10 (adjustment of the position in a Z direction, i.e., adjustment of a height, in this example) by adjusting a distance (spacing, in this example) from the housing 120A containing the body 10 and the housing 120B containing the infrared-ray application unit 30. The housing 120B (the body 10) may move in the Z direction relatively with respect to the housing 120A (the infrared-ray application unit 30). In other words, in a state where the projection display unit 1 is placed on the installation surface 130, the output opening 31 of the infrared-ray application unit 30 may be fixed at a position in the vicinity of the projection surface 110, and only the body 10 (in detail, the projection opening 1a of the body 10) may be moved for the adjustment of the position (the height H) of the body 10.

One end of the adjusting member 40 may be fixed to the housing 120A, and the other end of the adjusting member 40 may be fixed to the housing 120B. Further, the adjusting member 40 may be a rod-like member that is allowed to be elongated or shortened in a stepwise manner or in a non-stepwise manner. FIG. 8 illustrates an example thereof. As illustrated, the adjusting member 40 may include a first rod 41 and a second rod 42 that have an identical axis (an axis A1), for example. Part of the second rod 42 may be inserted into the first rod 41 that has a hollow shape. The second rod 42 may slide inside the first rod 41 in a stepwise manner or in a non-stepwise manner, and be locked inside the first rod 41.

FIGS. 9A, 9B, and 9C each illustrate an example of the first rod 41 and the second rod 42. Referring to the example illustrated in FIG. 9A, the first rod 41 may have a hole H1. A pressure inside the first rod 41 may be adjusted by means of the hole H1, thereby causing the second rod 42 to slid inside the first rod 41 along the axis A1, and bring the second rod 42 into engagement. This configuration allows for an operation of elongating and shortening of the adjusting member 40 in the stepwise manner or in the non-stepwise manner, allowing for the adjustment of the position in the stepwise manner or in the non-stepwise manner. Referring to the example illustrated in FIG. 9B, a plurality of concaves b11 may be provided at predetermined intervals in an inner wall of the first rod 41. Convexes b21 may be provided on a side surface of the second rod 42. The convexes b21 may be brought into engagement with the concaves b11. The second rod 42 may be brought into engagement with the first rod 41 at a position at which the convexes b21 are fit into the respective concaves b11. This configuration allows for the operation of elongating and shortening of the adjusting member 40 in the stepwise manner, allowing for the adjustment of the position in the stepwise manner. Referring to the example illustrated in FIG. 9C, convexes b12 may be provided on the inner wall of the first rod 41. A plurality of concaves b22 that are to be brought into engagement with the convexes b12 may be provided in the side surface of the second rod 42 at predetermined intervals. The second rod 42 may be brought into engagement with the first rod 41 at a position at which the convexes b12 are fit into the respective concaves b22. This configuration allows for the operation of elongating and shortening of the adjusting member 40 in the stepwise manner, allowing for the adjustment of the position in the stepwise manner.

FIG. 10 illustrates another configuration example of the adjusting member 40. The adjusting member 40 may include the first rod 41 and the second rod 42 as described above; however, the adjusting member 40 may include four members (the first rod 41, the second rod 42, a third rod 43, and a fourth rod 44) as in the example illustrated in FIG. 10. In this case, the second rod 42 may be provided in contact with inside of the first rod 41, the third rod 43 may be provided in contact with inside of the second rod 42, and the fourth rod 44 may be provided in contact with inside of the third rod 43. By thus configuring the adjusting member 40 to have multiple members, it is possible to perform finer adjustment of the position.

It is to be noted that the configuration of the adjusting member 40 is not limited to the above-described configurations as long as the length (the height) is adjustable in a stepwise manner or in a non-stepwise manner. Further, the operation of elongating or shortening the adjusting member 40 may be performed manually or automatically. A detailed example of performing the operation automatically will be described later.

[Workings and Effects]

Referring to FIG. 11, the projection display unit 1 may project, with the projection lens 16, image information V1 provided on the light valve 12 onto the projection surface 110 to enlarge and display the image information V1 as a projected image V2. The projection surface 110 may be a top of a table, for example. Moreover, the projection display unit 1 may also detect a position of the indicator 71 on the basis of the infrared ray La1 traveling from the indicator (the object) 71 on the projection surface 110 by means of the imaging signal DO obtained from the imaging device 13. Examples of the position of the indicator 71 may include a position Pt1 of the characteristic point of the indicator 71 such as a human finger and a pointer.

In the present embodiment, the projection lens 16 may be shared by the projection optical system 10A and the detection optical system 10B, and the imaging device 13 may be disposed at the position optically conjugate with the position of the light valve 12. This allows for object detection that has a detection region (a detectable region) that is substantially the same as the projected screen S11. Moreover, the foregoing optically-conjugate positional relationship makes it possible to monitor, via the projection lens 16, the position Pt1 of the characteristic point of the indicator 71 on the projection surface 110 to be overlapped with the projected image V2. Moreover, for example, it is possible to perform a pointing operation on the projected image V2 by performing an image process on a shape of the indicator 71 by the imaging signal processor 17 to detect the coordinates of the position Pt1 of the characteristic point of the indicator 71. In this case, any coordinate position in the projected screen S11 may correspond to a coordinate position in the imaging device 13 on a one-to-one basis. Accordingly, a coordinate of the detection position Pt2 on the imaging device 13 side may correspond to a coordinate of the position Pt1 of the characteristic point of the indicator 71. In other words, it is possible to detect an object by associating the detection position Pt2 with the position in the projected screen S11 without performing a complicated signal process such as calibration. It is to be noted that the number of the indicator 71 may be two or more. For example, coordinates of tips of fingers of both hands may be detectable. By using the position of the characteristic point of the indicator 71 detected in such a manner, it is possible to perform an intuitive operation as if a touch panel is embedded in the projected image V2 of the projector.

Incidentally, for a general projector, it is possible to vary the size of the projected screen by varying the projection distance. For example, in a case of a short throw type projector as with that in the present embodiment, the projection distance is varied by causing the body 10 (the projection opening 1a) to be away from the projection surface 110, i.e., by varying the height H of the body 10 from the installation surface 130. FIG. 12A illustrates the respective unit configurations in a case where the projected screen S11 is relatively small (a projected screen S1a). FIG. 12B illustrates the respective unit configurations in a case where the projected screen S11 is relatively large (a projected screen S1b).

As described above, in the present embodiment, the spacing between the first housing 120A and the second housing 120B may be adjusted by the operation of elongating and shortening of the adjusting member 40. This may vary the height H of the body 10 (the projection opening 1a). As illustrated in FIG. 12A, the height H of the body 10 may be decreased (H=Hs) by shortening the adjusting member 40 to decrease the spacing. As illustrated in FIG. 12B, the height H of the body 10 may be decreased (H=Ht) by elongating the adjusting member 40 to increase the spacing. The projected screen S1a in the case of the height Hs may have a relatively small size. The projected screen S1b in the case of the height Ht may have a relatively large size. The spacing between the housings 120A and 120B may be adjusted by the operation of elongating and shortening the adjusting member 40. This may adjust the position of the body 10. This makes it possible to increase or decrease the size of the projected screen S11.

On the other hand, in order to perform the object detection on the projected screen S11, it may be preferable that the infrared ray be applied along the surface in the vicinity of the projection surface 110 (that the detection light plane 110A be formed in the vicinity of the projection surface 110). Hence, the projection display unit 1 may have a configuration in which the infrared-ray application unit 30 applies the infrared ray along the surface in the vicinity of the projection surface 110 while being placed on the surface (the installation surface 130) that is the extension of the projection surface 110.

If there is provided a unit configuration in which the body including the projection optical system and the detection optical system and the infrared-ray application unit are integrated together with each other, the position of the body and the position of the infrared-ray application unit move in association with each other. Therefore, the position of the infrared-ray application unit is varied when the position of the body is adjusted and the projection distance is thereby varied. In other words, when an attempt is made to vary the size of the projected screen by varying the projection distance, the position at which the infrared ray is applied is also varied. This prevents application of the infrared ray to the vicinity of the projection surface. As described above, in the unit configuration in which the body and the infrared-ray application unit are integrated together with each other, it is necessary to select either one of the function of varying the size or the object detection function, and it is difficult to achieve the both functions together.

In contrast, in the present embodiment, the body 10 and the infrared-ray application unit 30 may be provided separately from each other, and the body 10 may be movable with respect to the infrared-ray application unit 30 (the output opening 31). This achieves a configuration in which the position of the body 10 with respect to the projection surface 110 is adjustable. Specifically, in the projection display unit 1, the housing 120A including the infrared-ray application unit 30 and the housing 120B including the body 10 may be disposed on the installation surface 130 with spacing in between. The projection display unit 1 may include the adjusting member 40 that adjusts the foregoing spacing. The position (the height H) of the body 10 may be adjusted owing to the adjustment of the spacing by the adjusting member 40. It may be therefore possible to vary the position of the body 10 to adjust the projection distance without varying the position (the height) of the output opening 31 for the infrared ray with respect to the projection surface 110 (the installation surface 130) (FIGS. 12A and 12B). In other words, it is possible to apply the infrared ray for the object detection along the surface in the vicinity of the projection surface 110 while increasing or decreasing the size of the projected screen S11 by adjusting the projection distance.

As described above, according to the present embodiment, the body 10 including the projection optical system 10A and the detection optical system 10B may be movable with respect to the infrared-ray application unit 30 that applies the infrared ray along the surface in the vicinity of the projection surface 110 while being placed on the surface that is the extension of the projection surface 110. The position of the body 10 with respect to the projection surface 110 may be therefore adjustable. Accordingly, it is possible to perform the object detection on the projection surface 110 even when the size of the projected screen is increased or decreased by varying the projection distance. As a result, it is possible to achieve both the object detection function and the function of varying the size of the projected screen.

Accordingly, it is possible for the user to increase or decrease the size of the projected screen S11 depending on the size of the projection surface 110 such as the top of the table, the usage environment, the usage purpose, etc. It is also possible to perform touch input on the projected screen S11 independently of the size of the projected screen S11. Accordingly, it is possible to achieve a function of a bidirectional conversation type.

Moreover, the following advantage is derived from providing the body 10 and the infrared-ray application unit 30 separately from each other. That is, the infrared-ray application unit 30 may include a light source such as a laser, and therefore easily generate heat. However, the projection optical system 10A or the detection optical system 10B may be provided separately from the infrared-ray application unit 30 to be separated away from the infrared-ray application unit 30. Hence, the projection optical system 10A or the detection optical system 10B may be less thermally influenced by the infrared-ray application unit 30.

Moreover, when the project display unit 1 is not in use, the project display unit 1 is allowed to have the minimum size with the housing 120A and the housing 120B being brought into proximity to each other by shortening the adjusting member 40. The project display unit 1 is thus allowed to be compact when being stored.

Modifications, etc. of the foregoing embodiment are described below. The components similar to those in the foregoing embodiment are denoted with the same numerals, and may not be further described where appropriate.

<Modification 1>

FIG. 13 schematically illustrates an outline configuration of a projection display unit according to Modification 1. The foregoing embodiment is described referring to an example unit configuration in which the body 10 and the infrared-ray application unit 30 (in detail, the infrared-ray application optical system 32) are provided separately from each other, i.e., the body 10 and the infrared-ray application unit 30 are contained in the housings 120A and 120B that are different from each other, respectively. However, the body 10 and the infrared-ray application unit 30 are not necessarily provided separately from each other. Part of the infrared-ray application unit (an infrared-ray application unit 30A) may be provided inside the housing 120B as in the present modification. Specifically, in the present modification, an optical system (an infrared-ray application optical system 30A1) corresponding to the infrared-ray application optical system 32 in the foregoing embodiment out of the infrared-ray application unit 30A may be provided inside the housing 120B together with the body 10. However, the output opening 31 for the infrared ray may be provided in the housing 120A on the installation surface 130 side as in the foregoing embodiment. The housing 120A may include a light guiding section 30A2 that guides the infrared ray from the infrared-ray application optical system 30A1 toward the output opening 31. The light guiding section 30A2 may include a reflective mirror 36, for example. The light guiding section 30A2 may vary an optical path of the infrared ray outputted from the infrared-ray application optical system 30A2 inside the housing 120B, and apply the infrared ray with the varied optical path along the surface in the vicinity of the projection surface 110 via the output opening 31. It is to be noted that the configuration other than the infrared-ray application unit 30A may be similar to that of the foregoing embodiment. It is to be noted that the provision of the reflective mirror 36 is not limitative, and an optical path varying device such as a prism may be used.

As in the present modification, part of the infrared-ray application unit 30A and the body 10 may be provided integrally, and the reflective mirror 36 may be used to apply the infrared ray to the vicinity of the projection surface 110. This configuration also makes it possible to adjust the position of the body 10 by adjusting the spacing between the housing 120A and the housing 120B with the adjusting member 40. Further, the position of the output opening 31 for the infrared ray may be fixed with respect to the projection surface 110 (the installation surface 130) even when the positions of the body 10 and the infrared-ray application optical system 30A1 are changed. It is therefore possible to vary the projection distance without varying the position from which the infrared ray is applied. Accordingly, it is possible to achieve effects equivalent to those of the foregoing embodiment.

<Modification 2>

FIG. 14 schematically illustrates an outline configuration of a projection display unit according to Modification 2. The foregoing embodiment is described referring to an example case in which the distance from the housing 120A to the housing 120B may be adjusted manually by means of the adjusting member 40. However, as in the present modification, the distance adjustment may be performed automatically by means of the adjusting member (an adjusting member 40A). Specifically, one end of the adjusting member 40A may be coupled to a drive unit 60 such as a motor. The adjusting member 40 may include a pair of screw sections 45 and 46 (a male screw section and a female screw section) that are fit into each other, for example. One of the pair of screw sections 45 and 46 (for example, the screw section 45) may be coupled to the drive unit 60, and be fixed to the housing 120B via the drive unit 60. The other (for example, the screw section 46) may be fixed to the housing 120A. The drive unit 60 may cause the screw section 45 to pivot on the basis of a control signal supplied from the controller 20 illustrated in FIG. 2. A depth by which the screw section 45 and the screw section 46 are fit into each other may be adjustable owing to the drive unit 60. This makes it possible to adjust the position of the body 10 in a stepwise manner or in a non-stepwise manner.

A configuration in which the drive unit 60 is coupled to the adjusting member 40 to automatically adjust the position of the body 10 may be provided as in the present modification. It is possible to vary the projection distance without varying the position of the output opening 31 also in such a configuration. Accordingly, it is possible to achieve effects equivalent to those of the foregoing embodiment. It is to be noted that the present modification is described referring to an example configuration using screws. However, such a configuration is not limitative. A configuration which makes it possible to adjust the position of the body 10 by means of, for example, a motor or a gear may be provided.

Moreover, the following function may be achievable since the position of the body 10 is allowed to be automatically adjusted. For example, the controller 20 may be able to control the drive unit 60 on the basis of a signal such as a signal (a touch input signal) supplied by a touch input performed by the user via the detection optical system 10B and a signal (an externally-inputted signal) supplied via an external electronic device such as a remote controller, thereby adjusting the distance from the housing 120A to the housing 120B, for example. In other words, the size of the projected screen S11 may be increased or decreased by adjusting the position of the body 10 on the basis of a signal such as the imaging signal and the externally-inputted signal. Alternatively, for example, an operation button may be provided in the projection display unit 1. The distance from the housing 120A to the housing 120B may be adjusted on the basis of a signal (an operation input signal) supplied by means of this button.

Examples of the touch input operation may include an operation of indicating, for example, with a finger, two points that are separated from each other on the projection surface 110, and increasing or decreasing the distance between the two points. A control may be executed to adjust the position of the body 10 and thereby increase or decrease the size of the projected screen S11 upon detection of the foregoing operation. Further, a control may be executed to set the size of the projected screen S11 on the basis of the foregoing signal such as the touch input signal, the externally-inputted signal, and the operation input signal, and to so adjust the position of the body 10 that the size of the projected screen S11 becomes the set size. Further, the adjusting member 40A may be driven and the position of the body 10 may be thereby adjusted so that the projected screen S11 has a predetermined size (for example, 25 inches, 32 inches, etc.) upon starting of the unit.

<Application Examples>

The projection display unit 1 that achieves both the object detection function and the function of varying the size of the projected screen described above may achieve the following function (an application function), for example. However, the function described below is a mere example, and other various functions may be achievable. It is to be noted that the function described below may be performed by the controller 20, the imaging signal processor 17, or the image signal processor 19 illustrated in FIG. 3, or an unillustrated function controller, for example.

In the projection display unit 1, the projection distance may be varied and the size of the projected screen S11 may be thereby increased or decreased by adjusting the position of the body 10. However, image quality or brightness of the projected image may be varied (for example, optimized) in accordance with the variation in size of the projected screen S11. For example, when the size of the projected screen S11 is varied, the image quality of the image after the variation in size of the projected screen S11 may be degraded in a factor such as sharpness and a contrast ratio, compared to the image having the original size. Further, the brightness may be excessively low or excessively high, for example. An optimal value of brightness may differ between sizes. Taking into consideration such cases, a process of varying a factor such as sharpness, a contrast ratio, and an amount of light applied by the illuminator 11 may be performed in accordance with the size of the projected screen S11 when the size of the projected screen S11 is varied. Specifically, the image quality may be adjusted (for example, by enhancing the sharpness of the projected image or increasing the contrast ratio) or the projected image may be increased in brightness in accordance with an increase in size of the projected screen S11. Further, such variation in image quality and brightness may be performed on the basis of, for example, the touch input performed by the user, the input from the external electronic device, or the operation input performed on the projection display unit 1. Alternatively, a correction value corresponding to the size may be held in advance, and calibration may be performed automatically in accordance with the variation in size.

Further, for example, an illuminance sensor may be mounted on the projection display unit 1. The brightness of the projected image may be varied thereby in accordance with the usage environment (brightness). Specifically, the projected image may be increased in brightness (the amount of light applied by the illuminator 11 may be increased) in accordance with an increase in brightness of the usage environment.

Moreover, the amount of infrared ray applied by the infrared-ray application unit 30 may be varied in accordance with the size of the projected screen S11. Specifically, the amount of applied infrared ray may be increased in accordance with an increase in size of the projected screen S11. This makes it possible to perform the object detection in a substantially entire region of the projected screen S11 even when the size of the projected screen S11 is varied.

In addition thereto, focusing of the detection optical system 10B may be adjusted in accordance with the size of the projected screen S11. This makes it possible to perform the object detection with high accuracy even when the projection distance is varied.

Further, the size of the projection surface 110 or a projectable range on the projection surface 110 may be detected, and the size of the projected screen S11 may be optimized taking into consideration a result of the detection. For example, the size of the projected screen S11 may be so adjusted that the projected screen S11 does not extend to the outside of the top of the table such as a table and a desk. Alternatively, the size of the projected screen S11 may be so adjusted that the projected screen S11 is provided in a range avoiding an obstacle such as a cup, a stand, a PC, etc. on the table, or in a range avoiding a level difference.

Further, for example, a predetermined inclination angle sensor and a correction mechanism may be mounted. An inclination angle may be thereby detected to correct an application angle of the infrared ray, for example, when the installation surface 130 is inclined with respect to the projection surface 110, or when the projection display unit 1 is partially placed on a level difference, an obstacle, etc. and thereby inclined. It is thus possible to apply the infrared ray along the surface in the vicinity of the projection surface 110. Further, this correction of the application angle may be substantially able to be performed even when the inclination angle sensor is not provided. For example, when the installation surface 130 is inclined with respect to the projection surface 110, the infrared ray outputted from the infrared-ray application unit 30 may be applied to the projection surface depending on a direction of the inclination. In this case, the imaging device 13 may detect the light reflected by the projection surface 110 even when an object such as a finger is not present on the projection surface 110. This may prevent the object detection with high accuracy. To address this, the application angle of the infrared ray may be so corrected (adjusted) that light constantly reflected by the projection surface 110 is not present. This makes it possible to apply the infrared ray in an appropriate angular direction even without the inclination angle sensor, thereby making it possible to perform the object detection with high accuracy.

In addition thereto, a set value for an electric power saving mode may be held in advance. The size of the projected screen may be set on the basis of the setting for the electric power saving mode. Further, upon the setting of the electric power saving mode, the usage environment (the brightness) described above may be preferably taken into consideration.

Description is given above referring to the embodiment and the modifications. However, the present disclosure is not limited to the foregoing embodiment, etc., and may be modified in various ways. For example, the foregoing embodiment is described referring to an example case in which the projection surface 110 (the installation surface 130) and the output opening 31 of the infrared-ray application unit are fixed, and the body 10 is selectively moved to perform the adjustment of the position. However, the projection display unit according to the present disclosure is not limited to this configuration. For example, a unit configuration may be provided in which the body 10 is fixed, and a movable stage (floor) may be provided as the projection surface 110 (the installation surface 130). The output opening 31 of the infrared-ray application unit may be moved in association with this movable stage. This configuration may vary the position of the body 10 with respect to the projection surface 110, therefore making it possible to vary the projection distance. In contrast, the position of the output opening 31 with respect to the projection surface 110 is not varied. Therefore, it is possible to perform the object detection in the vicinity of the projection surface 110. In other words, the part to be movable may be either of the body 10 and the infrared-ray application unit 30 as long as the body 10 is "relatively" movable with respect to the output opening 31 of the infrared-ray application unit 30.

Moreover, the foregoing embodiment, etc. are described referring to an example configuration in which the first housing and the second housing are provided with the spacing (gap) in between. However, another member may be provided between these housings (the spacing may not be necessarily provided between the housings). For example, the whole space between the housings may be covered by an exterior material that is able to be expanded and contracted. An example structure may include a flexible member that is able to be expanded and contracted in an accordion-like manner and is provided between the housings. Alternatively, a frame-like member (a wall member) that is able to be expanded and contracted may be so provided as to surround the whole space between the housings. An example structure may include a plurality of frame-like members having inner diameters different from each other that are coupled to each other in a slidable manner.

Moreover, in the foregoing embodiment, the reflective liquid crystal device is used as the light valve of the disclosure. However, the light valve of the disclosure is not limited to the reflective liquid crystal device and may be another light valve. For example, a digital mirror device (DMD) may be used as the light valve. In this case, the light valve may be of a mirror type that does not utilize polarization characteristics of light. Therefore, a polarization optical system is not used in general. However, an optical system including a polarization separation device such as a polarizing beam splitter in an optical path is allowed to be provided as in the foregoing embodiment to achieve image display using the DMD.

Moreover, the foregoing embodiment is described referring to the ultra-short throw type as one example of the projection display unit of the disclosure. However, the projection display unit of the disclosure is not necessarily limited thereto. The projection display unit may be of any type as long as the projection optical system and the detection optical system share the projection lens and the imaging device is disposed at a position optically conjugate with the position of the light valve. It is to be noted that the effects described above in the foregoing embodiment, etc. are mere examples. Any other effect may be provided, and any other effect may be further included.

For example, the disclosure may achieve the following configurations.

(1)

A projection display unit including:

a body including a projection optical system and a detection optical system, the projection optical system projecting an image onto a projection surface, the detection optical system acquiring an imaging signal based on invisible light; and an invisible light application unit that applies invisible light along a surface in the vicinity of the projection surface while being placed on a surface that is an extension of the projection surface, in which the body is movable with respect to an output opening of the invisible light application unit, and a position of the body is adjustable with respect to the projection surface.

(2)

The projection display unit according to (1), further including:

a first housing that contains the invisible light application unit;

a second housing that is provided above the first housing and contains the body; and an adjusting member that allows the position of the body to be adjustable through adjustment of a distance from the first housing to the second housing.

(3)

The projection display unit according to (2), in which the adjusting member has one end fixed to the first housing and the other end fixed to the second housing, and is a rod-shaped member that is allowed to be elongated and shortened in a stepwise manner or in a non-stepwise manner.

(4)

The projection display unit according to (2) or (3), further including a drive unit that is coupled to the adjustment member, and adjusts the distance with the adjusting member.

(5)

The projection display unit according to (4), in which the adjusting member includes a pair of screw sections that are fit into each other, one of the pair of screw sections being fixed to the first housing, the other of the pair of screw sections being fixed to the second housing, and the drive unit adjusts the position of the body by causing the one of the pair of screw sections or the other of the pair of screw sections to pivot and thereby adjusting a depth by which the pair of screw sections are fit into each other.

(6)

The projection display unit according to (4), in which the drive unit adjusts the position of the body on the basis of one of a signal supplied via the detection optical system, a signal supplied via an external electronic apparatus, and an operation input signal supplied to the drive unit.

(7)

The projection display unit according to (6), in which, when an operation of indicating two points that are separated away from each other on the projection surface and increasing or decreasing a distance between the two points is detected on the basis of the signal supplied via the detection optical system, the position of the body is adjusted and a size of a screen to be projected onto the projection surface is thereby increased or decreased.

(8)

The projection display unit according to any one of (1) to (7), in which the invisible light application unit includes an invisible light application optical system, and a light guiding section that includes a reflective mirror and guides the invisible light to the output opening.

(9)

The projection display unit according to (8), further including:

a first housing that contains the light guiding section;

a second housing that is provided above the first housing, and contains the body and the invisible light application optical system; and an adjusting member that allows the position of the body to be adjustable through adjustment of a distance from the first housing to the second housing.

(10)

The projection display unit according to any one of (1) to (9), in which a size of a screen to be projected onto the projection surface is increased or decreased through adjustment of the position of the body.

(11)

The projection display unit according to (10), in which image quality or brightness of the image is varied in accordance with the size of the screen.

(12)

The projection display unit according to (11), in which the brightness of the image is varied also in accordance with brightness of an environment in which the projection display unit is used.

(13)

The projection display unit according to (10), in which an amount of the invisible light to be applied by the invisible light application unit is varied in accordance with the size of the screen.

(14)

The projection display unit according to any one of (1) to (13), in which an angle at which the invisible light is applied is corrected when a surface on which the projection display unit is placed is inclined with respect to the projection surface.

(15)

The projection display unit according to any one of (1) to (14), in which image quality or brightness of the image is adjusted on the basis of one of a signal supplied via the detection optical system, a signal supplied via an external electronic apparatus, and an operation input signal supplied to the projection display unit.

(16) The projection display unit according to any one of (1) to (15), further including
a polarization separation device that separates entering light into polarized components that are different from each other and outputs the polarized components in directions that are different from each other, in which
the projection optical system includes an illuminator, a projection lens, and a light valve that modulates illumination light supplied from the illuminator on the basis of an image signal, and outputs the modulated illumination light toward the projection lens,
the detection optical system includes an imaging device that is disposed in a position that is optically conjugate with a position of the light valve, and
the polarization separation device is disposed between the light valve and the projection lens.

(17) The projection display unit according to (16), in which the projection lens is a short throw lens.

(18) The projection display unit according to (16), in which the light valve is a reflective liquid crystal display device.

(19) The projection display unit according to any one of (1) to (18), in which the invisible light is infrared light.

(20) The projection display unit according to any one of (1) to (19), further including an imaging signal processor that detects a position of an object on the projection surface on the basis of an imaging signal obtained from the imaging device.

(21) The projection display unit according to (11), in which, in accordance with an increase in the size of the screen, at least one of sharpness and a contrast ratio of the image is adjusted or brightness of the image is increased.

(22) The projection display unit according to (12), in which brightness of the image is increased in accordance with an increase in brightness of the environment in which the projection display unit is used.

(23) The projection display unit according to (13), in which the amount of the invisible light to be applied is increased in accordance with an increase in the size of the screen.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projection display unit, comprising:
a second housing comprising a body, wherein the body includes:
a projection optical system configured to project an image onto a projection surface; and
a detection optical system configured to acquire an imaging signal based on invisible light received by the detection optical system;
a first housing comprising an invisible light application unit configured to apply the invisible light along a first surface in vicinity of the projection surface, wherein the second housing is above the first housing; and
an adjusting member configured to adjust a position of the body with respect to the projection surface, based on an adjustment of a distance from the first housing to the second housing.

2. The projection display unit according to claim 1, wherein
the adjusting member comprises:
a first end fixed to the first housing; and
a second end fixed to the second housing, and
the adjusting member is a rod-shaped member configured to elongate and shorten in one of a stepwise manner or a non-stepwise manner.

3. The projection display unit according to claim 1, further comprising
a drive unit coupled to the adjusting member,
wherein the drive unit is configured to control the adjusting member to adjust the distance from the first housing to the second housing.

4. The projection display unit according to claim 3, wherein
the adjusting member further includes a pair of screw sections that are configured to fit into each other,
a first screw section of the pair of screw sections is fixed to the first housing and a second screw section of the pair of screw sections is fixed to the second housing, and
the drive unit is further configured to:
pivot one of the first screw section or the second screw section;
adjust the position of the body with respect to an opening through which the invisible light is applied along the first surface by the invisible light application unit, wherein the position of the body is adjusted based on the pivot; and
adjust a depth by which the pair of screw sections fit into each other.

5. The projection display unit according to claim 3, wherein the drive unit is further configured to adjust the position of the body based on one of a signal supplied via the detection optical system, a signal supplied via an external electronic apparatus, or an operation input signal supplied to the drive unit.

6. The projection display unit according to claim 5, wherein
the detection optical system is further configured to:
detect a first operation that indicates two points separated away from each other on the projection surface; and
detect a second operation that indicates an increase or a decrease in a distance between the two points,
the first operation and the second operation are detected based on the signal supplied via the detection optical system,
the drive unit is further configured to adjust the position of the body based on the detection of the second operation, and
a size of a screen to be projected onto the projection surface is increased or decreased based on the adjustment of the position of the body.

7. The projection display unit according to claim 1, wherein the invisible light application unit includes:
an invisible light application optical system; and
a light guiding section that includes a reflective mirror,
wherein the light guiding section is configured to guide the invisible light to an opening through which the invisible light is applied along the first surface by the invisible light application unit.

8. The projection display unit according to claim 1, wherein a size of a screen to be projected onto the projection surface is increased or decreased based on the adjustment of the position of the body with respect to the projection surface.

9. The projection display unit according to claim 8, wherein at least one of an image quality and a brightness of the projected image is varied based on the size of the screen to be projected.

10. The projection display unit according to claim 9, wherein the brightness of the projected image is varied based on a brightness of an environment in which the projection display unit is used.

11. The projection display unit according to claim 8, wherein an amount of the invisible light to be applied by the invisible light application unit along the first surface is varied based on the size of the screen.

12. The projection display unit according to claim 1, wherein
an angle at which the invisible light is applied by the invisible light application unit along the first surface is corrected based on an inclination of a second surface with respect to the projection surface, and
the second surface is an extension of the projection surface.

13. The projection display unit according to claim 1, wherein at least one of an image quality or a brightness of the projected image is adjusted based on one of a signal supplied via the detection optical system, a signal supplied via an external electronic apparatus, or an operation input signal supplied to the projection display unit.

14. The projection display unit according to claim 1, further comprising:
a polarization separation device configured to:
receive light from a first direction;
separate the received light into a plurality of polarized components that are different from each other; and
output the plurality of polarized components in a plurality of directions that are different from each other, wherein
the projection optical system includes:
an illuminator;
a projection lens; and
a light valve configured to:
modulate illumination light supplied from the illuminator based on an image signal; and
control output of the modulated illumination light toward the projection lens,
the detection optical system includes an imaging device in a position that is optically conjugate with a position of the light valve, and
the polarization separation device is between the light valve and the projection lens.

15. The projection display unit according to claim 14, wherein the projection lens is a short throw lens.

16. The projection display unit according to claim 14, wherein the light valve is a reflective liquid crystal display device.

17. The projection display unit according to claim 1, wherein
the invisible light application unit is further configured to be placed on a second surface that is an extension of the projection surface,
the body is movable with respect to an opening through which the invisible light is applied along the first surface by the invisible light application unit,
the position of the body is adjustable with respect to the projection surface, and
the invisible light is infrared light.

18. The projection display unit according to claim 1, further comprising an imaging signal processor configured to detect a position of an object on the projection surface based on an imaging signal obtained from an imaging device of the detection optical system.

19. A projection display unit, comprising:
a body including:
a projection optical system configured to project an image onto a projection surface; and
a detection optical system configured to acquire an imaging signal based on invisible light received by the detection optical system;
an invisible light application unit configured to apply the invisible light along a first surface in vicinity of the projection surface, wherein the invisible light application unit includes:
an invisible light application optical system; and
a light guiding section that includes a reflective mirror, wherein the light guiding section is configured to guide the invisible light to an opening through which the invisible light is applied along the first surface by the invisible light application unit;
a first housing that comprises the light guiding section;
a second housing that is above the first housing, and comprises the body and the invisible light application optical system; and
an adjusting member configured to adjust a position of the body with respect to the projection surface based on an adjustment of a distance from the first housing to the second housing.

20. A projection display unit, comprising:
a body including:
a projection optical system configured to project an image onto a projection surface; and
a detection optical system configured to acquire an imaging signal based on invisible light received by the detection optical system; and
an invisible light application unit configured to apply the invisible light along a first surface in vicinity of the projection surface,
wherein an angle at which the invisible light is applied by the invisible light application unit along the first surface is corrected based on an inclination of a second surface with respect to the projection surface, and
the second surface is an extension of the projection surface.

* * * * *